US012535188B2

(12) United States Patent
Nicolini et al.

(10) Patent No.: US 12,535,188 B2
(45) Date of Patent: Jan. 27, 2026

(54) PROTECTION DEVICE FOR A CONTAINER FOR PRESSURIZED GAS

(71) Applicant: CAVAGNA GROUP S.P.A., Calcinato (IT)

(72) Inventors: Giancarlo Nicolini, Villanuova (IT); Elena Rossini, Calcinato (IT)

(73) Assignee: CAVAGNA GROUP S.P.A., Calcinato (IT)

( * ) Notice: Subject to any disclaimer, the term of this patent is extended or adjusted under 35 U.S.C. 154(b) by 0 days.

(21) Appl. No.: 18/716,856

(22) PCT Filed: Dec. 22, 2022

(86) PCT No.: PCT/IB2022/062688

§ 371 (c)(1),
(2) Date: Jun. 5, 2024

(87) PCT Pub. No.: WO2023/119227

PCT Pub. Date: Jun. 29, 2023

(65) Prior Publication Data

US 2025/0043923 A1 Feb. 6, 2025

(30) Foreign Application Priority Data

Dec. 22, 2021 (IT) ........................ 102021000032201

(51) Int. Cl.
*F17C 13/12* (2006.01)

(52) U.S. Cl.
CPC .... *F17C 13/123* (2013.01); *F17C 2205/0165* (2013.01); *F17C 2205/0196* (2013.01); *F17C 2205/0308* (2013.01); *F17C 2205/0323* (2013.01)

(58) Field of Classification Search
CPC ...... F17C 2205/0188; F17C 2205/0308; F17C 13/123; F17C 2205/0165; F17C 2205/0323; F17C 2270/025; F17C 2205/0192; F16J 13/16; F16J 13/20; F16J 13/22
See application file for complete search history.

(56) References Cited

U.S. PATENT DOCUMENTS

| | | | | | |
|---|---|---|---|---|---|
| 4,964,529 | A * | 10/1990 | Houston | F17C 13/084 | 220/601 |
| 2011/0168726 | A1* | 7/2011 | Silva Vieira | F17C 1/16 | 220/590 |
| 2014/0251456 | A1* | 9/2014 | Cesbron | A61M 16/20 | 137/382 |
| 2015/0083237 | A1* | 3/2015 | Ligonesche | B23P 15/001 | 228/173.6 |
| 2015/0260344 | A1* | 9/2015 | Frenal | F17C 1/00 | 137/382 |

(Continued)

*Primary Examiner* — Don M Anderson
(74) *Attorney, Agent, or Firm* — Flener IP & Business Law

(57) ABSTRACT

A protection device for a container for pressurized gas comprises a main body which is configured so as to at least partially close a valve body of the container and a coupling element being rotatably connected to the main body. The main body comprises an abutment element which extends in the direction away from the main body, the abutment element being configured in such a manner that, when the coupling element is in an open configuration, a receiving cavity is defined between the abutment element and the arms and is configured to receive a bar-shaped element.

20 Claims, 5 Drawing Sheets

(56) References Cited

U.S. PATENT DOCUMENTS

| | | | | |
|---|---|---|---|---|
| 2015/0260345 | A1* | 9/2015 | Frenal | F17C 1/00<br>220/726 |
| 2017/0114961 | A1* | 4/2017 | Baune | F17C 13/04 |
| 2020/0032961 | A1* | 1/2020 | Volkan | F17C 13/04 |
| 2022/0107056 | A1* | 4/2022 | LeBlanc | F17C 3/00 |
| 2024/0208787 | A1* | 6/2024 | Kim | F17C 13/06 |

* cited by examiner

PROTECTION DEVICE FOR A CONTAINER FOR PRESSURIZED GAS

The present invention relates to a protection device for containers for pressurized gas, of the type intended for protecting a valve body, the container of which is provided for dispensing the gas contained therein, and comprising a coupling element which is rotatably connected to a main body of the protection device and which is provided with a pair of arms.

In the technical field of containers for pressurized gas, there is often a widespread need to provide a coupling system for the container, typically in the form of a bottle, in order to prevent it from remaining supported on the ground and generally to be able to arrange it closer to the supply location of the gas.

A typical context in which this requirement is felt is constituted by the hospital sector, in which it is necessary to supply oxygen to the patient, or another gas which is intended for a specific therapy. To this end, there are used bottles which contain compressed gas and which are suspended on the bed of the patient in order to facilitate the dispensing thereof.

In order to make the positioning of the bottles easier, there have been developed coupling systems which are configured in such a manner that they couple the bottle to one of the tubular members of the hospital bed.

In particular, there are known solutions in which these coupling systems are in the form of hooks which are rotatably connected to protection caps of the dispensing valves of the valve.

The possible capacity for rotation particularly allows the hook to be used to engage with the bottle on the bed during the use thereof and to be rotated into a position behind the body of the cap or more generally the bottle when it is not being used.

In this manner, the hook does not interfere when the bottle is moved or is stored in a store.

In the simplest embodiments thereof, such as, for example, the one described in WO2013/001190, this hook is formed by a structure made from a metal rod which is folded in a suitable manner.

However, this solution has disadvantages linked with the relative ease of deformation of the metal during use. In fact, unless significant construction costs are involved, the metal structure necessarily has to be constructed in a simple and light manner, to the detriment of the robustness thereof. Particularly when the hook is removed in order to be able to suspend the bottle, flexion stresses which can deform the structure of the hook can readily be generated.

In other solutions, the hook is instead formed by a plastics structure which is suitably shaped so as to close on the body of the cap when it is in a closed position, as described or set out, for example, in EP2918893, EP3260760 and FR3018582.

However, these solutions can also have weaknesses in terms of robustness. In fact, the hook is configured so as to define a seat, in which one of the tubular members which forms the structure of the bed is received, and, for this reason, it is necessary to make provision for the hook to be able to extend sufficiently in a cantilevered manner with respect to the body of the bottle. It is evident that this necessity makes the hook readily subject to the risk of damage during use.

Furthermore, in some of the known solutions the hook is integrated in the main structure of the protection cap in such a manner that, when it is closed, it forms an external wall thereof. This may lead to a relatively weak structure as a result of the dimensions of the hook.

Therefore, the problem addressed by the present invention is to provide a protection device for pressurized gas containers which is structurally and functionally configured to at least partially overcome one or more of the disadvantages set out with reference to the cited prior art.

Another object is to provide a protection device for pressurized gas containers which can be readily suspended near the zones where the gas supply is required, such as, for example, a hospital bed.

Another object of the present invention is to provide a protection device which is provided with a coupling device which is robust, economical and simple to construct and which, at the same time, does not constitute an obstacle during the handling of the container.

This problem is solved and these objects are achieved by the invention by means of a protection device for containers for pressurized gas, comprising a valve body which is provided for dispensing the gas which is contained in the container comprising one or more of the features mentioned in the appended claims.

The protection device of the present invention comprises a main body which is configured so as to at least partially close the valve body and a coupling element comprising a pair of arms.

Preferably, the coupling element is rotatably connected to the main body about a rotation axis so as to be positioned in two different configurations, a first closed configuration, in which the arms are directed towards the valve body and/or the pressurized container, and a second open configuration, in which the arms are in a remote position with respect to the main body.

The main body comprises an abutment element which extends in the direction away from the main body.

The abutment element is preferably configured in such a manner that, when the coupling element is in an open configuration, a receiving cavity is defined between the abutment element and the arms and is configured to receive a bar-shaped element, for example, a tubular member of the structure of a hospital bed, in such a manner that the bar-shaped element is in contact with both the abutment element and the arms.

Preferably, in some embodiments, the bar-shaped element has a circular cross-section or sections with different shapes, such as an oval cross-section, rectangular cross-section, with a regular polygonal shape or also irregular polygonal shape.

It will be appreciated that the protection device of the present invention allows the use of shorter extension arms than the known solutions because they cooperate with the abutment element in defining the support of the protection device and therefore of the bottle, on the frame of a bed or on any other structure having similar characteristics.

In fact, the abutment element can be rigidly connected to the main body or constructed in one piece therewith, reducing the risk of possible damage to it. Furthermore, the cantilevered extent from the main body of the extension element and arms may be substantially halved or also further reduced with respect to the known solutions because the two portions cooperate to produce the cavity for receiving the tubular member of the bed.

The abutment element may further cooperate with the support element in order to prevent rotations of the bottle when it is supported on the bar of a bed, improving the stability thereof.

In preferred embodiments, the abutment element comprises an abutment surface which preferably has a curved surface. Advantageously, the centre of curvature of the curved surface is located on a straight line parallel with the rotation axis of the coupling element.

The curved surface preferably has concavity which is directed towards the coupling element.

In preferred embodiments, the arms define an additional abutment surface which extends along a circumferential arc. Preferably, the additional abutment surface has a centre of curvature which is located on an additional straight line parallel with the rotation axis.

As a result of these characteristics, the cavity defined by the abutment element and the arms is advantageously configured so as to receive a tubular structure with a circular cross-section.

The two surfaces, preferably having different curvatures, also allow tubular structures to be received with cross-sections with shapes different from the circular shape.

Preferably, in some embodiments, the abutment surface and the additional abutment surface have the same curvature, with centres of curvature located on straight lines parallel with the rotation axis X. It will be appreciated that, as a result of this characteristic, the coupling element can be located in such a position that the centre of curvature of the additional abutment surface coincides with the centre of curvature of the abutment surface and therefore the two straight lines parallel with the rotation axis X are coincident, receiving even more effectively a tubular structure with a circular cross-section, preferably with a radius substantially corresponding to the radius of the curvature of the abutment surfaces. Preferably, the abutment surface of the abutment element and/or the additional abutment surface extend over an angle less than 90°.

It will be appreciated that, on the basis of these characteristics, the support of the bar-shaped element can be brought about by using two portions which extend over less than 90° in such a manner that the support is brought about on two opposite surfaces with respect to the axis of the bar-shaped element. This allows the use of two modest extension portions while ensuring appropriate stability for the structure.

Advantageously, the arms comprise a shock-absorbing coating which defines the additional abutment surface, reducing the stresses which occur when the coupling element is supported on the bar-shaped element.

In some embodiments, the main body comprises a handle, which is preferably arranged in a position which, during use, is directed upwards. Advantageously, the coupling element and the abutment element are arranged in a vertically opposite position with respect to the handle.

This arrangement prevents or limits the presence of the structure formed by the coupling element and the abutment element from impeding correct engagement and movement of the container as a result of the handle present on the protection device.

Preferably, the main body is formed by two half-shells which are joined in the region of a plane perpendicular to the rotation axis, to the advantage of simplicity of construction and robustness of the device.

According to yet another aspect, the arms in the closed configuration define a lower edge of the protection device, the lower edge extending along a circumferential arc in continuation of a retention collar which is defined by the main body and which is configured so as to block the protection device on the container.

It is thereby possible to minimize the dimensions of the coupling element when it is in the closed configuration.

Preferably, the retention collar together with the arms define a closed ring which is configured to extend about a main axis of the container. The retention collar may have a lower notch in the region of which the arms 20 in the closed configuration can be received. Advantageously, the arms extend over an extent less than half of the perimeter defined by the closed ring. These characteristics each allow the impact to be limited in terms of weight reduction which the presence of the arms involves in the overall structure of the main body.

According to another aspect, the coupling element comprises an opening, preferably a through-opening, which is intended to receive an end of the abutment element when the coupling element is in the closed configuration.

As a result of this characteristic, the abutment element, while projecting with respect to the main body, cannot increase the overall dimensions of the protection device when the coupling element is in the closed configuration.

In some embodiments, the coupling element comprises a tapered portion which tapers in the direction towards the opening, the tapered portion preferably defining a surface which is conjugate to the abutment surface. It will be appreciated that the tapered portion can be subjected to modest resilient deformations, allowing the coupling element to be snap-fitted on the abutment element.

Advantageously, the rotation axis of the coupling element is arranged in a position, during use, which is vertically higher with respect to the abutment element. Preferably, the coupling element is configured so as to rotate downwards in order to be moved from the open configuration to the closed configuration.

Advantageously, the coupling element, when in the closed configuration, can be arranged so as to at least partially cover the abutment element.

In some embodiments, the abutment element is of wedge-like form so as to define a notch in a downward direction during use of the protection device.

Preferred features of the invention are more generally defined by the dependent claims.

The features and advantages of the invention will be better appreciated from the detailed description of a number of embodiments thereof which are illustrated by way of non-limiting example with reference to the appended drawings, in which.

Figure 1:
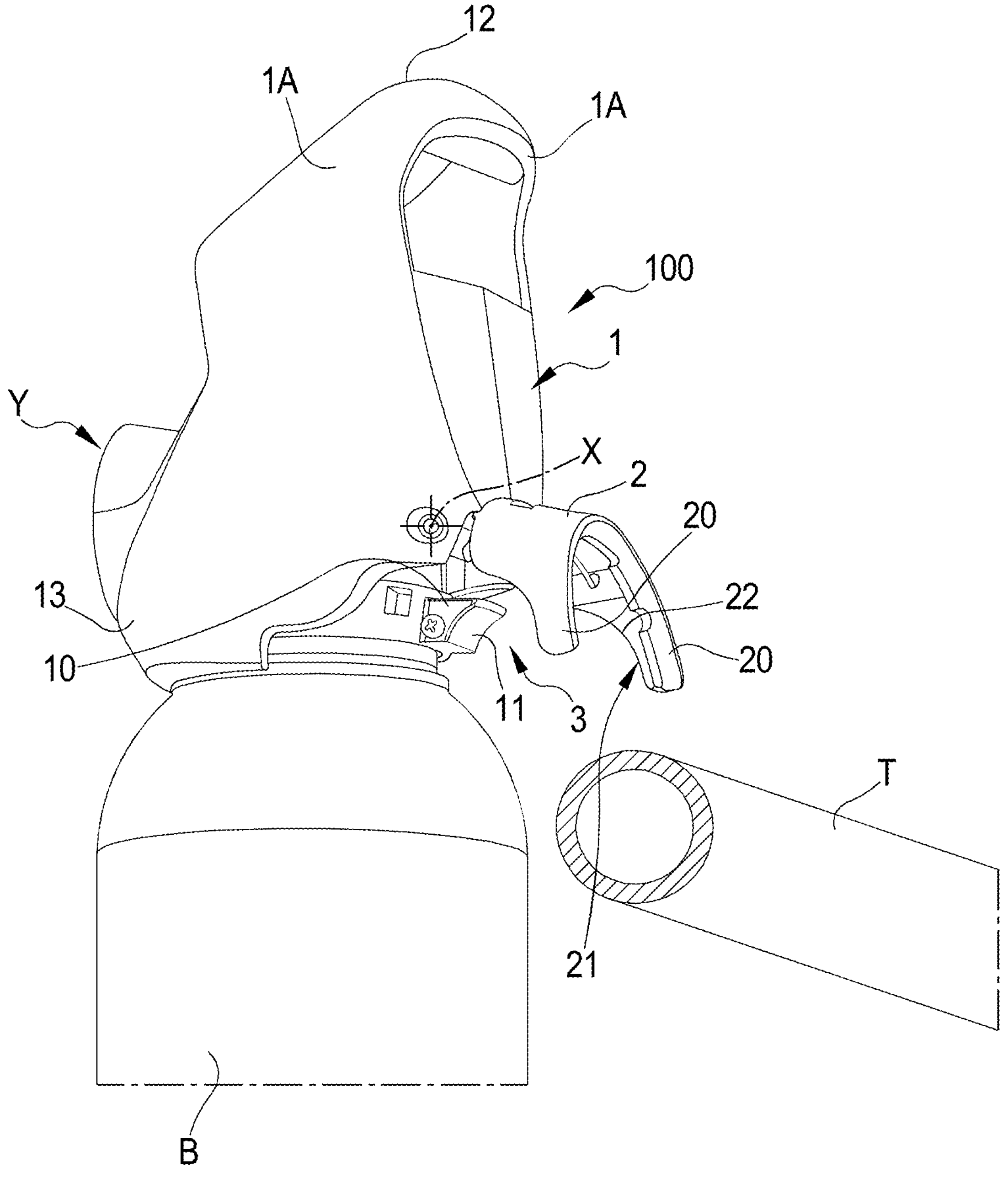
FIG. 1 is a perspective view of a container for gas, in which the protection device according to the present invention is installed, while it is positioned on a tubular element.

Initially with reference to FIG. 1, a protection device according to the present invention is generally designated 100.

As may be observed in FIG. 1, the protection device 100 is intended to be used in a container for pressurized gas, for example, a bottle B.

The bottle comprises a valve body V which is covered by the protection device 100 and which is only schematically indicated in FIG. 1.

The protection device 100 comprises a main body 1 which is preferably configured so as to close the valve body V. There may be provided openings which are not illustrated in the Figures and which are constructed so as to be able to afford access to a control handwheel for dispensing the gas, in order to afford access to connectors for filling the container and for connection to potential supply means or for making optional indicators of the state of the container visible from the exterior, such as, for example, the pressure of the gas present therein, where applicable in the form of a digital display.

In preferred embodiments, the main body further comprises a handle 12 which allows the bottle B to be gripped using a single hand and, in any case, in a secure manner.

The handle 12 can be arranged in a vertically higher position than the protection device 100.

It will be appreciated that, in the context of the present invention, the vertical direction and particularly the upward and downward directions are unambiguously defined by the characteristics of the container. For example, in the case of a cylindrical bottle, the vertical direction is defined by the axis of the bottle and the upward and downward directions are indicated by the attachment for the valve body V and the base of the bottle itself, respectively.

In any case, it is evident that a person skilled in the art will be able to unambiguously recognize these directions for each type of container.

Still with reference to FIG. 1, the protection device 100 further comprises a coupling element 2 which is configured so as to engage with the protection device, together with the bottle B on a bar-shaped element T. For example, in the embodiment illustrated in FIG. 1, this bar-shaped element is defined by a tubular member which may form a portion of a frame of a hospital bed. In any case, it is evident that other arrangements may be provided for the device according to the present invention and the use in hospital beds must not be considered to be limiting. Furthermore, the tubular member described in the present embodiment has a circular cross-section but it will be understood that the invention may also be used in the case of cross-sections with different shapes, such as an oval cross-section, rectangular cross-section, with a regular polygonal shape, that is to say, a convex polygon with all the sides of an equal size and all the angles of an equal magnitude, or also with an irregular shape.

Figure 5:
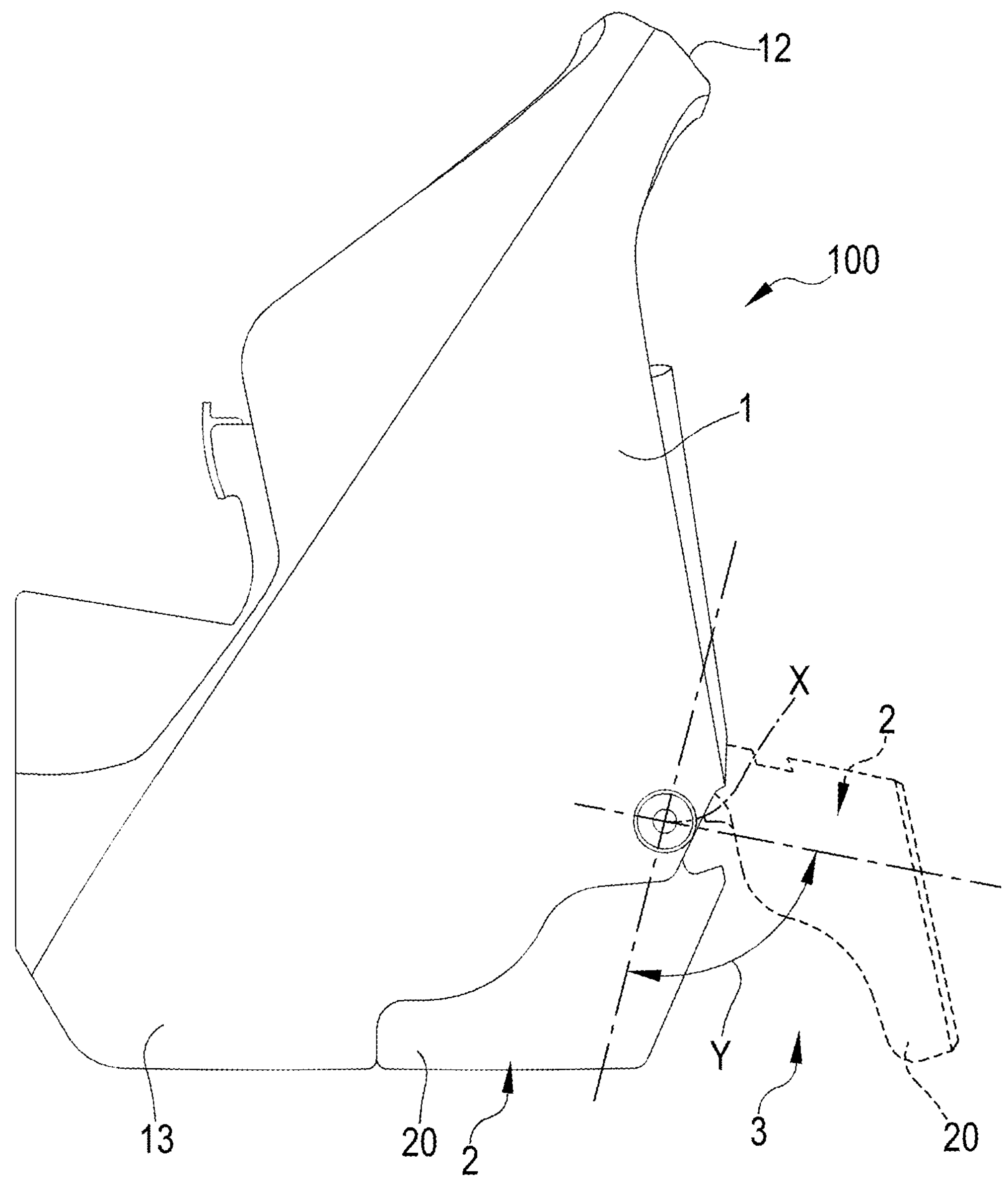
FIG. 5 is a side view of the protection device of the present invention which illustrates the movement of the coupling element between the closed configuration and the open configuration.

As can better be observed in FIG. 5, the coupling element 2 is rotatably connected to the main body 1 about a rotation axis X so as to be positioned in two different configurations, a first closed configuration which is illustrated in the Figure with a solid line and a second open configuration which is instead illustrated with broken lines.

As can be seen in the Figure, the coupling element 2 can be moved from the open configuration to the closed configuration by means of a rotation in a downward direction.

Advantageously, this can be carried out with a rotation about an angle $\gamma$ less than 90°. Preferably, the angle $\gamma$ is less than 90° and greater than or equal to 70°, preferably less than 90° and greater than or equal to 80°, preferably less than 90° and greater than or equal to 85°.

It is known that a small rotation angle is advantageous because it simplifies the movement of the coupling element and reduces the risks of damage during the rotation.

The two rotation limit positions, which define the closed configuration and open configuration, respectively, can be defined by means of abutment between the main body 1 and the coupling element 2.

Figure 2:
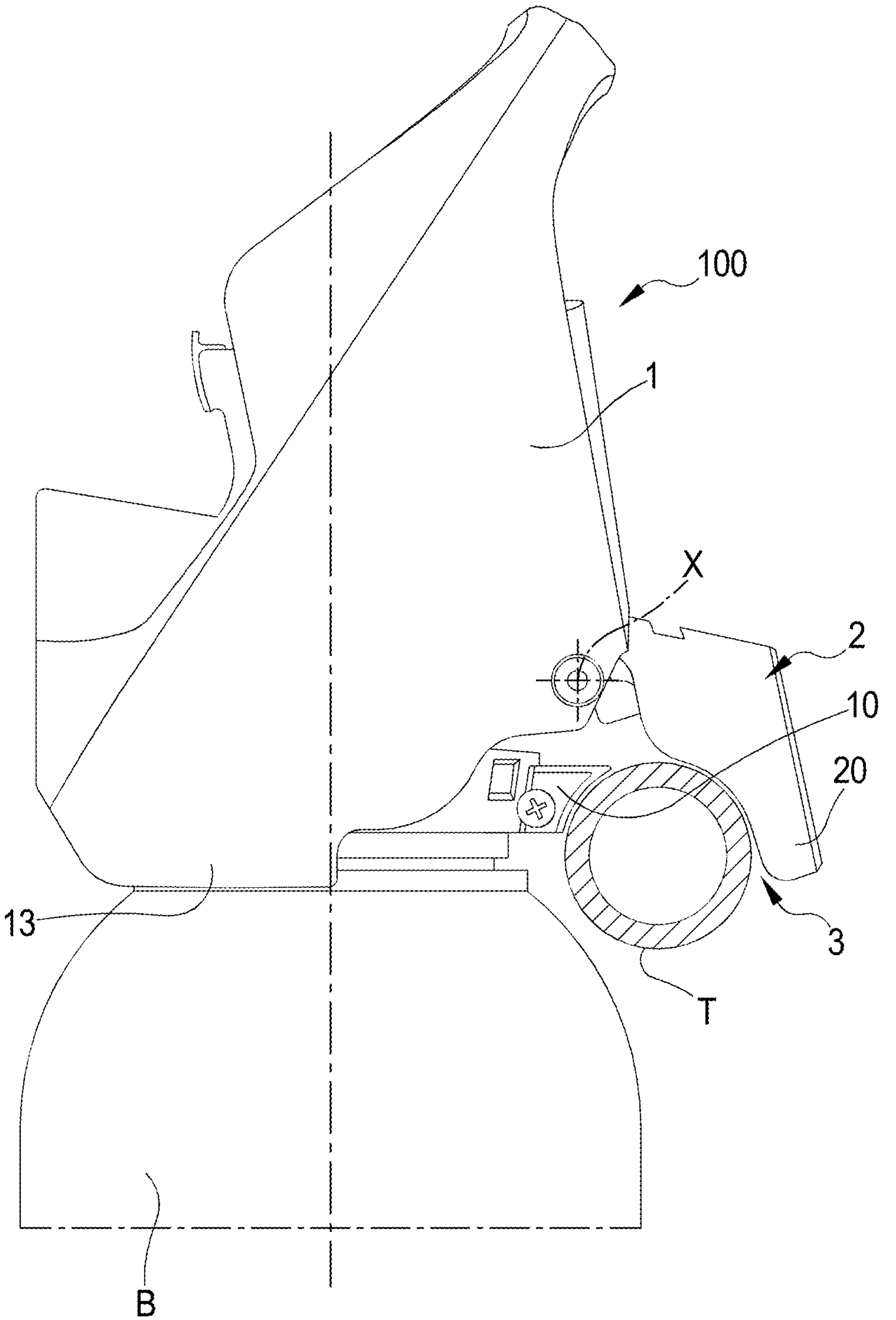
FIG. 2 is a side view of the container with the protection device of FIG. 1 when it is supported on the tubular element.

Again with reference to FIG. 1, the coupling element 2 comprises a pair of arms 20 which allow support on the bar-shaped element T, as can be observed in the embodiment of FIG. 2.

In order to improve the contact with the bar-shaped element, in some embodiments there is provision for the arms 20 to comprise a shock-absorbing coating 22 which defines an abutment surface 21, in the region of which the contact between the arms 20 and element T is brought about.

Figure 3:
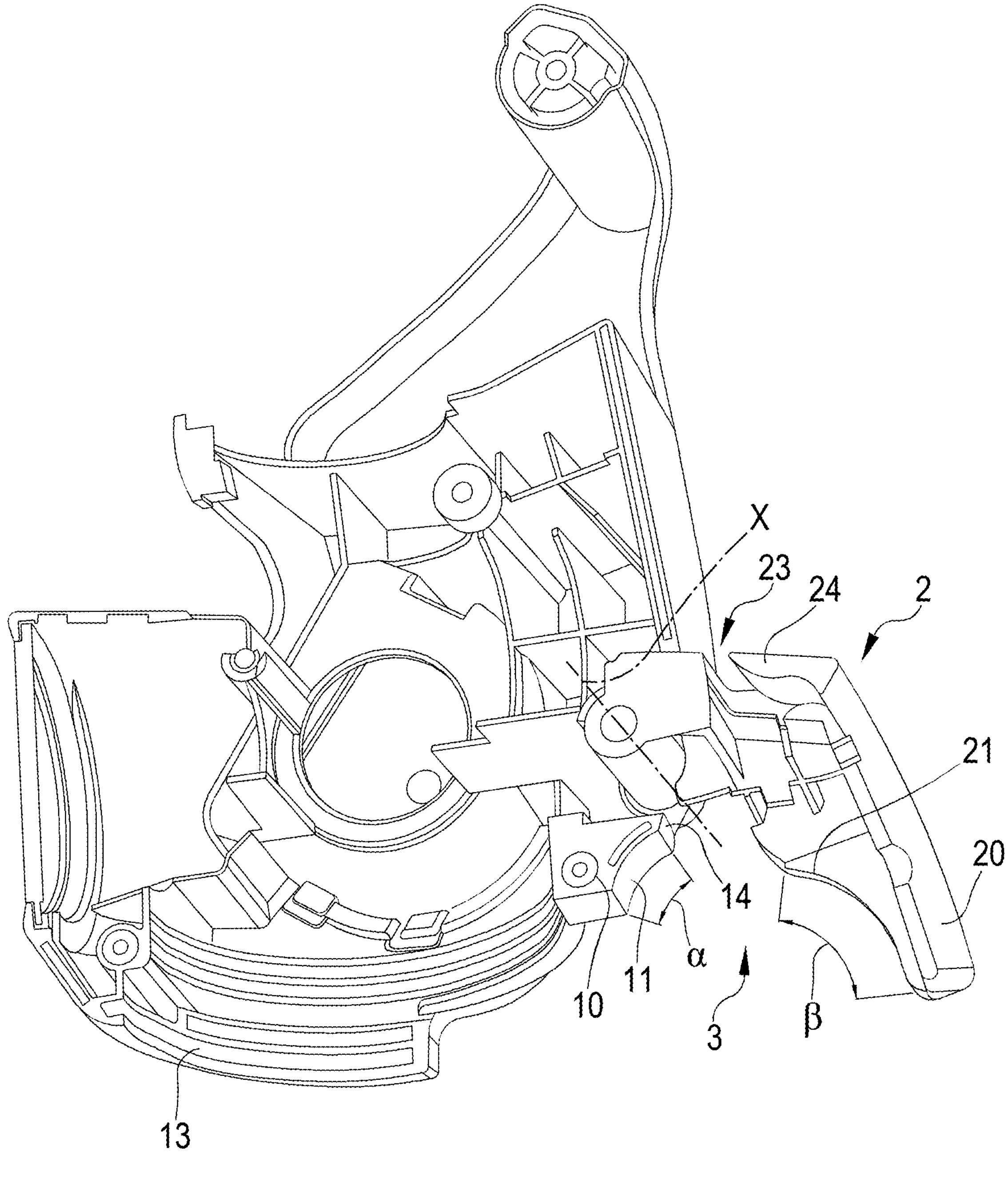
FIGS. 3 and 4 are two perspective sectioned views which illustrate the protection device with a coupling element in an open configuration and a closed configuration, respectively.
Figure 4:
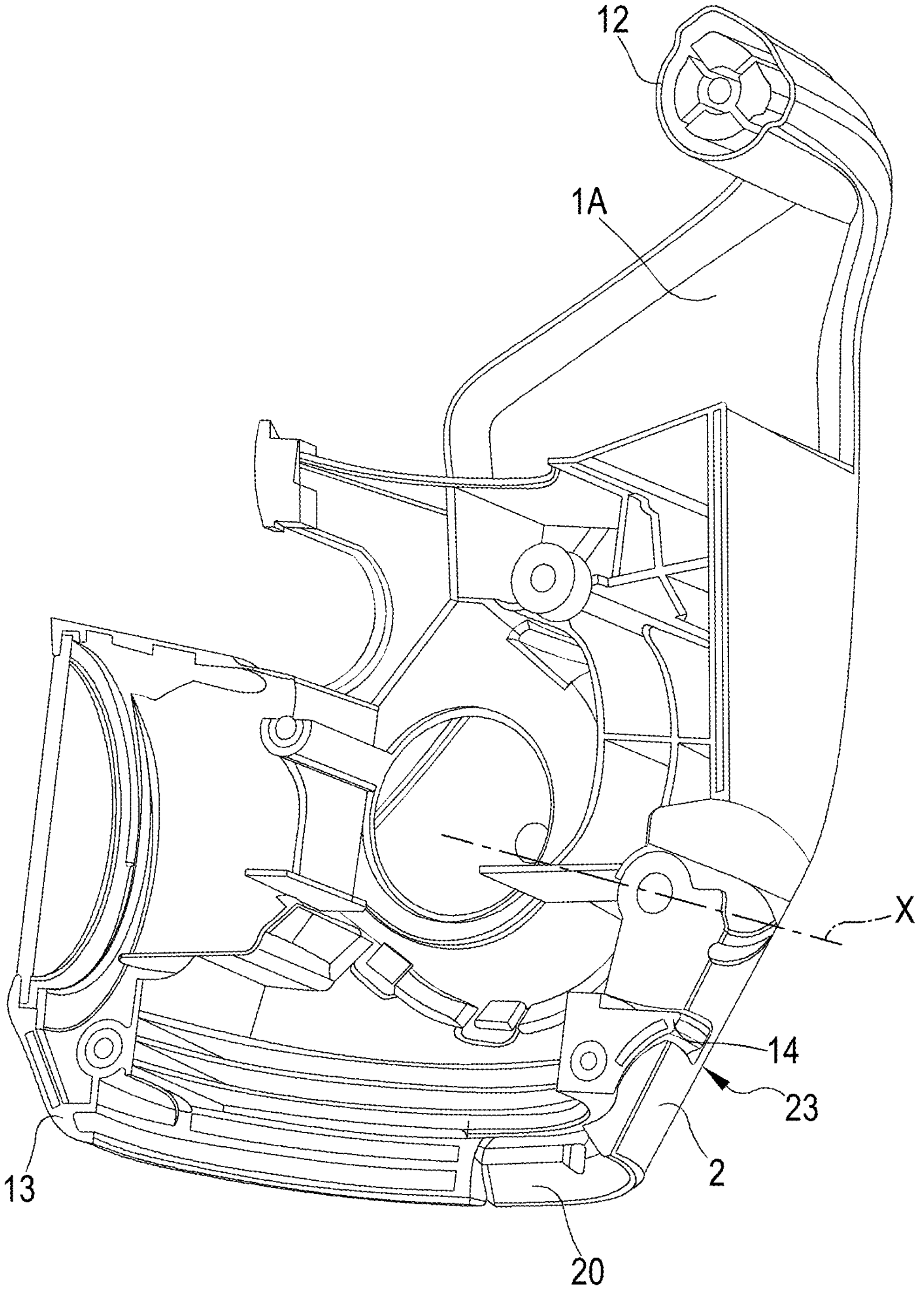

As may be observed in FIGS. 3 and 4, in the first closed configuration, the arms 20 are directed towards the valve body V and the pressurized container while, in the second open configuration, the arms 20 are in a remote position with respect to the main body 1.

As can better be seen by means of the embodiment of FIG. 1 and FIG. 4, the arms 20, when they are in the closed configuration, advantageously define a lower edge of the protection device 1.

The lower edge extends along a circumferential arc in continuation of a retention collar 13 which is defined by the main body 1 and which is used to block the protection device 1 on the container B. The retention collar may have a lower notch, as illustrated in FIG. 3, in the region of which the arms 20 can be received in the closed configuration.

In some embodiments, the retention collar 13, together with the arms 20, define a closed ring which is configured to extend about the main axis of the bottle B. Typically, the bottle B is provided with a neck, on which the valve body V is mounted and the collar is mounted so as to extend about the neck of the bottle.

In order to carry out the mounting of the protection device on the bottle, there may be provision for the main body 1 to be formed by two half-shells 1A which are joined in a plane perpendicular to the rotation axis X.

It will further be appreciated that the extent of the arms 20 along this perimeter may be less than half of the perimeter of the ring.

Now with reference again to FIG. 1, the main body 1 advantageously comprises an abutment element 10 which extends in the direction away from the main body 1 and is preferably rigidly fixed thereto. For example, the abutment element 10 can be formed in one piece with the main body 1, where applicable also divided into two portions which are each fixedly joined to the two half-shells 1A.

As may also be observed in FIG. 2, the abutment element 10 is formed and arranged in such a position that, when the coupling element 2 is in an open configuration, there is defined between the abutment element 10 and the arms 20 a receiving cavity 3 which is configured to receive the bar-shaped element T.

In other words, when the cavity 3 defined in this manner is configured so that, when the protection device 100 is supported on the element T, it is in contact both with the abutment element 10 and with the arms 20. Therefore, both the elements contribute to the positioning of the bottle B.

As may be observed in the embodiment of FIG. 5, in some embodiments the coupling element 2, when in the closed configuration, is arranged so as to cover the abutment element 10.

Advantageously, the rotation axis X of the coupling element 2 can be arranged in a position which is, during use, vertically higher with respect to the abutment element 10.

According to another aspect, the abutment element 10 may have a wedge-like shape so as to define a notch in a downward direction of the protection device 100, thereby defining an abutment surface 11 which is directed downwards and which is therefore suitable for coming into contact with the element T.

Now also with reference to FIG. 3, in some embodiments the abutment surface 11 of the abutment element 10 has a curved surface with a centre of curvature which is preferably located on a straight line parallel with the rotation axis X. The curved surface preferably has a concavity which is directed towards the coupling element, as clearly shown in the same FIG. 3.

Similarly, the additional abutment surface 21 which is defined by the arms 20 can also extend along a circumferential arc with a centre of curvature located on an additional straight line which is still parallel with the rotation axis X. This configuration is particularly advantageous if the element T has a cross-section which is circular.

In preferred embodiments, the abutment surface 11 of the abutment element extends over an angle α less than 90°.

Similarly, the additional abutment surface 21 of the arms 20 can also extend over an angle β less than 90°.

In some embodiments, the abutment surface and the additional abutment surface may have the same curvature, with centres of curvature located on straight lines parallel with the rotation axis X. In this manner, if the coupling element is located in such a position that the centre of curvature of the additional abutment surface coincides with the centre of curvature of the abutment surface, and therefore the two straight lines which are parallel with the rotation axis X are coincident, a tubular structure with a circular cross-section can be received in a stable manner, preferably with a radius which substantially corresponds to the radius of the abutment surfaces.

Still with reference to FIG. 3, the coupling element 2 can further comprise an opening 23, preferably a through-opening, which is intended to receive an end 14 of the abutment element 10, as can better be seen in the closed configuration illustrated in FIG. 4.

The opening 23 can also be formed as a shaped open recess, which is defined in the region of an edge of the coupling element 2, as an alternative to the opening with a closed contour used in the embodiments illustrated in the Figures.

Still with reference to FIGS. 3 and 4, in some embodiments the coupling element 2 comprises a tapered portion 24 which tapers in the direction towards the opening 23. Preferably, the tapered portion 24 has a complementary shape with respect to the abutment element 10 and, to this end, can define a surface which is conjugate to the abutment surface 11.

Consequently, as may be observed in FIG. 4, the coupling element 2 can completely cover the abutment element 10 when in the closed configuration. Furthermore, when the coupling element 2 is in the closed configuration, no projecting portions are present and the coupling device 2 and the abutment element 10 are kept within the overall spatial requirement of the main body 1.

Therefore, it will be appreciated that the protection device according to the present invention allows a bottle to be coupled to the structure of a hospital bed or to similar elements with a simple and robust solution.

There is further ensured a high level of stability of the bottle when it is coupled in various configurations of the bar-shaped element to which the abutment element is coupled, as abutment element and arms can cooperate by adapting to various forms and dimensions of the element to which the bottle is coupled.

The invention claimed is:

1. A protection device for a container for pressurized gas, comprising a valve body which is provided for dispensing the gas which is contained in the container, the protection device comprising a main body which is configured so as to at least partially close the valve body and a coupling element comprising a pair of arms, the coupling element being rotatably connected to the main body about a rotation axis so as to be positioned in two different configurations, a first closed configuration, in which the arms are directed towards the valve body and/or the pressurized container, and a second open configuration, in which the arms are in a remote position with respect to the main body, the protection device being characterized in that the main body comprises an abutment element which extends in the direction away from the main body, the abutment is element being configured in such a manner that, when the coupling element is in an open configuration, a receiving cavity is defined between the abutment element and the arms and is configured to receive a bar-shaped element, having a circular or oval or rectangular cross-section or with a regular polygon shape, in such a manner that the bar-shaped element is in contact with both the abutment element and the arms, wherein the abutment element comprises an abutment surface which has a curved surface, and wherein the abutment surface extends over an angle (α) less than 90°.

2. The protection device according to claim 1, wherein the curved surface defines a center of curvature, the center of curvature of the curved surface being located on a straight line parallel with the rotation axis.

3. The protection device according to claim 1, wherein the curved surface has concavity which is directed towards the coupling element.

4. The protection device according to claim 1, wherein each arm defines an additional abutment surface which extends along a circumferential arc.

5. The protection device according to claim 4, wherein the additional abutment surface has a center of curvature which is located on an additional straight line parallel with the rotation axis.

6. The protection device according to claim 4, wherein the abutment surface and the additional abutment surface have the same curvature.

7. The protection device according to claim 6, wherein the abutment surface and the additional abutment surface define respective centers of curvature, the centers of curvature being located on straight lines parallel with the rotation axis.

8. The protection device according to claim 4, wherein the arms comprise a shock-absorbing coating which defines the additional abutment surface.

9. The protection device according to claim 1, wherein the coupling element comprises an opening which is intended to receive an end of the abutment element.

10. The protection device according to claim 9, wherein the opening is a through-opening.

11. The protection device according to claim 1, wherein the coupling element, when in the closed configuration, is arranged so as to at least partially cover the abutment element.

12. The protection device according to claim 1, wherein the main body comprises a handle.

13. The protection device according to claim 12, wherein the handle is arranged in a position which, during use, is directed upwards.

14. The protection device according to claim 12, wherein the coupling element and the abutment element are arranged in a position vertically opposite the handle.

15. A protection device for a container for pressurized gas, comprising a valve body which is provided for dispensing the gas which is contained in the container, the protection device comprising a main body which is configured so as to at least partially close the valve body and a coupling element comprising a pair of arms, the coupling element being rotatably connected to the main body about a rotation axis so as to be positioned in two different configurations, a first closed configuration, in which the arms are directed towards the valve body and/or the pressurized container, and a second open configuration, in which the arms are in a remote position with respect to the main body, the protection device being characterized in that the main body comprises an abutment element which extends in the direction away from the main body, the abutment is element being configured in such a manner that, when the coupling element is in an open configuration, a receiving cavity is defined between the abutment element and the arms and is configured to receive a bar-shaped element, having a circular or oval or rectangular cross-section or with a regular polygon shape, in such a manner that the bar-shaped element is in contact with both the abutment element and the arms, wherein the abutment element comprises an abutment surface which has a curved surface, wherein each arm defines an additional abutment surface which extends along a circumferential arc, and wherein the additional abutment surface extends over an angle (β) less than 90°.

16. A protection device for a container for pressurized gas, comprising a valve body which is provided for dispensing the gas which is contained in the container, the protection device comprising a main body which is configured so as to at least partially close the valve body and a coupling element comprising a pair of arms, the coupling element being rotatably connected to the main body about a rotation axis so as to be positioned in two different configurations, a first closed configuration, in which the arms are directed towards the valve body and/or the pressurized container, and a second open configuration, in which the arms are in a remote position with respect to the main body, the protection device being characterized in that the main body comprises an abutment element which extends in the direction away from the main body, the abutment is element being configured in such a manner that, when the coupling element is in an open configuration, a receiving cavity is defined between the abutment element and the arms and is configured to receive a bar-shaped element, having a circular or oval or rectangular cross-section or with a regular polygon shape, in such a manner that the bar-shaped element is in contact with both the abutment element and the arms, wherein the arms in the closed configuration define a lower edge of the protection device, the lower edge extending along a circumferential arc in continuation of a retention collar which is defined by the main body and which is configured so as to block the protection device on the container.

17. The protection device according to claim 16, wherein the retention collar, together with the arms, defines a closed ring which is configured to extend about a main axis of the container.

18. The protection device according to claim 16, wherein the retention collar has a lower notch in the region of which the arms can be received in a closed configuration.

19. A protection device for a container for pressurized gas, comprising a valve body which is provided for dispensing the gas which is contained in the container, the protection device comprising a main body which is configured so as to at least partially close the valve body and a coupling element comprising a pair of arms, the coupling element being rotatably connected to the main body about a rotation axis so as to be positioned in two different configurations, a first closed configuration, in which the arms are directed towards the valve body and/or the pressurized container, and a second open configuration, in which the arms are in a remote position with respect to the main body, the protection device being characterized in that the main body comprises an abutment element which extends in the direction away from the main body, the abutment is element being configured in such a manner that, when the coupling element is in an open configuration, a receiving cavity is defined between the abutment element and the arms and is configured to receive a bar-shaped element, having a circular or oval or rectangular cross-section or with a regular polygon shape, in such a manner that the bar-shaped element is in contact with both the abutment element and the arms, wherein the coupling element comprises an opening which is intended to receive an end of the abutment element, the coupling element comprising a tapered portion which tapers in the direction towards the opening.

20. The protection device according to claim 19, wherein the tapered portion defines a surface which is conjugate to the abutment surface.

* * * * *